United States Patent [19]

Nagai et al.

[11] Patent Number: 4,641,319
[45] Date of Patent: Feb. 3, 1987

[54] METHOD FOR QUANTITATIVE DISCHARGE OF MOLTEN MATERIAL

[75] Inventors: Takaatsu Nagai, Tokyo; Masayuki Takada, Nagano; Akira Sato; Mineo Imamura, both of Kitakyushu, all of Japan

[73] Assignee: Nippon Steel Corporation, Tokyo, Japan

[21] Appl. No.: 592,576

[22] Filed: Mar. 23, 1984

[30] Foreign Application Priority Data

Mar. 31, 1983 [JP] Japan ................................ 58-53904

[51] Int. Cl.$^4$ ................................................ F27D 3/00
[52] U.S. Cl. ...................................... 373/84; 164/453; 266/240; 432/157
[58] Field of Search ................... 373/84, 104; 65/325; 164/4.1, 451, 452, 453; 266/45, 236, 240; 432/157, 160

[56] References Cited

U.S. PATENT DOCUMENTS 3,518,350 6/1970 Lunig .................................. 373/104
3,737,153 6/1973 Steffora et al. ....................... 373/84

Primary Examiner—Roy N. Envall, Jr.
Attorney, Agent, or Firm—Warren B. Kice

[57] ABSTRACT

In a method of intermittently charging a molten principal raw material and any supplementary material as needed to provide a specified raw material formulation into a melting furnace and continuously discharging a molten material therefrom, the discharge of the molten material is effected by determining the weight of the tiltable melting furnace, said weight changing with change of the raw materials and discharging of the molten material, computing the rate of change in weight of the molten material with respect to time from the determined weights of said furnace, and tilting said furnace to a position indicated by comparison of said computed rate of change in weight of the molten material with respect to time and the set rate of change in weight of the molten material with respect to time.

19 Claims, 5 Drawing Figures

METHOD FOR QUANTITATIVE DISCHARGE OF MOLTEN MATERIAL

BACKGROUND OF THE INVENTION

1. Field of the Invention

The present invention relates to a method for quantitative discharge of a molten material and, more particularly, to a method for quantitative discharge of a molten material from a melting furnace such as an electric furnace for the production of rock wool, devitro ceram and the like from molten blast furance slag.

2. Description of the Prior Art

As is known in the industry, molten slag available as by-product in large quantities from the blast furnace of a steel mill is quenched by water to produce water-granulated slag which finds its way into cement, blast furnace slag cement, soil improving agent, and aggregate for concrete. Also, molten slag is poured onto a slag bank and the air-cooled slag, after excavation, crushing and screening, is widely used as road base, aggregate for concrete, filling material for land reclamation, and raw material for rock wool.

Rock wool is conventionally made by mixing the crushed slag and supplementary materials added as needed to provide a specified raw material formulation and melting the mixture in a melting furnace such as an electric furnace and a cupola, charging the molten material to a fiberizing equipment and converting the material into fibers by the centrifugal force and/or a fluid such as compressed air and steam. The crushed slag thus used in the conventional method comes in a form convenient for transport and storage and also can be mixed readily with supplementary materials to give a specified raw material formulation for rock wool. On the other hand, the crushed slag causes a vast amount of sensible heat originally present in molten slag at the blast furnace site go to waste.

In recent years, from the standpoint of energy conservation, more attention is being paid to a process in which molten slag is charged into an electric furnace, the slag is adjusted for chemical composition and temperature there, and fed to a fiberizing equipment. This process requires only as much energy as to heat the molten slag slightly to melt away any supplementary material added to adjust the chemical composition, and realizes an exceptionally large reduction in energy requirement compared with the conventional method. A problem peculiar to this process, however, is that the blast furnace pours slag into a ladle intermittently at intervals of a few hours and the molten slag in the ladle which would radiate heat and solidify on standing needs to be charged into the electric furnace intermittently while still hot. As the commercial production of rock wool is normally a continuous operation, the molten material inside the electric furnace decreases continuously. For production of rock wool at a given level of quality in high yeilds, it is essential to minimize variations in the feed rate of the molten material to the fiberizing equipment, namely, to discharge the molten material from the electric furnace at a constant rate. This may be accomplished either by applying more pressure inside the electric furnace or by increasing the opening of the nozzle as the contents of the furnace decrease.

In practice, however, the former procedure will require separate installation of equipment for generation and control of pressure, resulting in a larger and more complicated system as a whole and further require to make the electric furnace an airtight pressure vessel. On the other hand, the latter will find a difficulty in adjusting the nozzle opening under precise control in response to the continuously changing weight of the contents of the furnace.

SUMMARY OF THE INVENTION

The object of the present invention is to provide a simple, precise means to discharge continuously the molten material from a melting furnace which receives the raw materials intermittently and to produce rock wool of good quality in high yeilds by a simplified operating procedure.

In a process for charging intermittently the molten raw material and supplementary materials added as needed to provide a specified raw material formulation and discharging continuously the molten material at a constant rate, the method of the present invention determines the weight of the tiltable melting furnace, said weight changing at all times with the intermittent charge of the molten raw materials and continuous discharge of the molten material, computes therefrom the rate of change in weight of the molten material with respect to time inside the furnace, compares the computed rate with the set rate, and tilts the furance to a suitable position.

DETAILED DESCRIPTION OF THE PREFERRED EMBODIMENTS

Preferred embodiments of the present invention will now be described.

Figure 1:
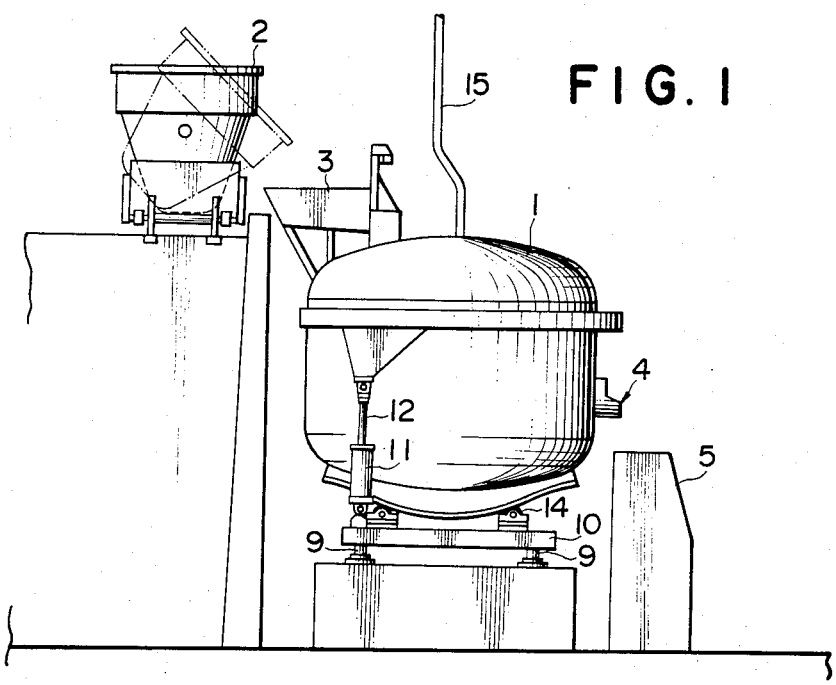
FIG. 1 is an elevational view of an arrangement of equipment for quantitative discharge in accordance with the present invention.

FIG. 1 is an elevational view of a system for making inorganic fibers such as rock wool from molten blast furnace slag in accordance with the method of the present invention.

The electric furnace 1 is equipped with a device for discharging the molten material at a constant rate. Molten slag is carried in the slag ladle 2 from the blast furnace (not shown) to near the electric furnace 1 and is poured in portions into the electric furnace 1 through the receiving port 3 placed at the top of the electric furnace 1. The supplementary materials to adjust the chemical composition, for example siliceous rock and others in the production of rock wool, are introduced through the feed pipe 15 and melted inside the electric furnace 1 at a temperature in the range of 1400° to 1500° C. The molten material flows out continuously at a constant rate through the nozzle 4 which forms an outlet of the electric furnace 1 and falls on the fiberizing equipment 5 where the molten material is made into rock wool fibers. In accordance with the present invention, the flow rate of the molten material from the nozzle 4 to the fiberizing equipment 5 is kept constant by tilting the electric furnace 1 slowly in response to the constantly changing weight of the contents inside the electric furnace 1.

Figure 3:
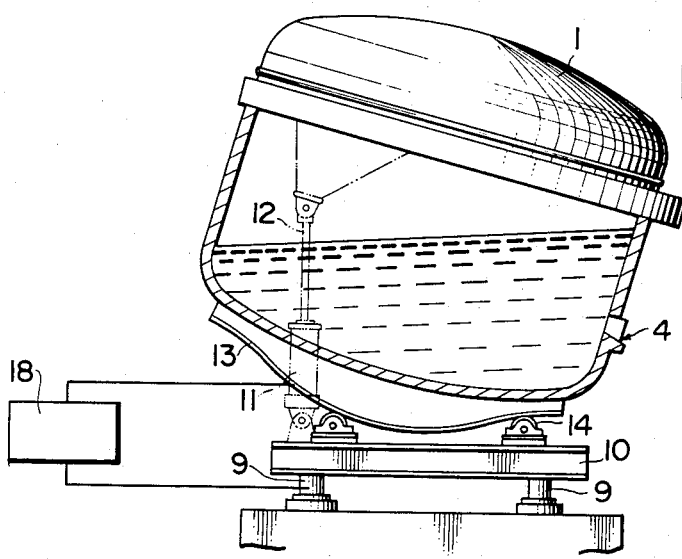
FIG. 3 shows the electric furnace being tilted in accordance with the method of the present invention.
Figure 2:
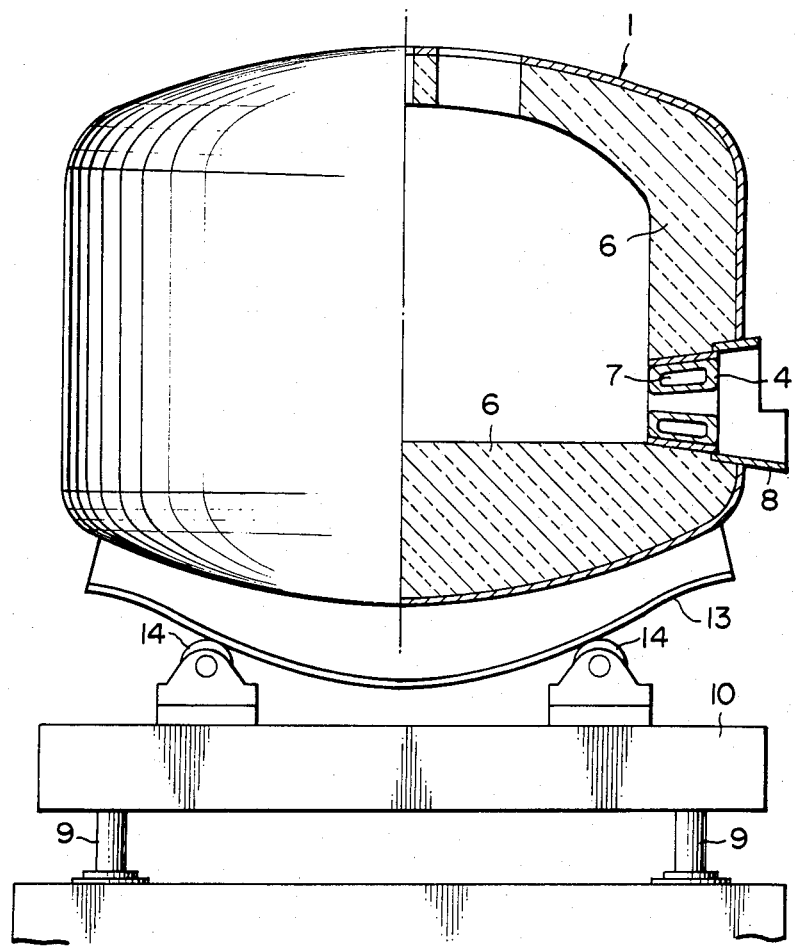
FIG. 2 is a sectional view of the electric furnace.

FIGS. 2 and 3 show the device for quantitative discharge of the molten material most suited for practicing the method of the present invention.

In this example, the electric furnace 1 is lined with multiple layers of refractory bricks 6 to prevent loss of heat by radiation from the furnace shell and is sealed with an inert gas such as nitrogen to prevent entry of air as much as possible. The nozzle 4 for discharge of the molten material is provided in the lower part of the electric furnace 1. The nozzle 4 is made of a heat resistant material. In this example, the nozzle 4 has the cavity 7 inside and water is circulated through the cavity 7 to cool the nozzle 4. The trough 8 is inserted into the nozzle 4 from outside. A pair of runners 13 each, with a sinuate edge, are provided at the bottom of the electric furnace 1 and slide on the quide rolls 14 attached to the pedestal 10 to tilt the electric furnace 1 up or down smoothly.

In accordance with the method of the present invention, the discharge of the molten material through the nozzle 4 must be made at a constant rate regardless of how much molten material is present inside the electric furnace 1 and this is accomplished by weighting the electric furnace 1, continuously or intermittently, and tilting the furnace in such a manner as to keep constant the rate of change in weight of the molten material with respect to time in spite of said weight changing constantly due to continuous discharge throught the nozzle 4. In the example, the load cells 9 placed at four corners underneath the pedestal 10 are used as a device to weigh the electric furnace 1. The weight of the electric furnace 1 changes all the time from the intermittent charge of the raw materials into the electric furnace 1 and the continuous discharge of the molten material through the nozzle 4 and the load cells 9 weigh the electric furnace 1, continuously or intermittently, and transmit the determined weight to the control equipment 18 connected between the load cells 9 and a hydraulic jack 11. The control equipment 18 finds the weight of the contents by subtracting the tare from the determined weight, computes the rate of change in weight of the molten material with respect to time ($\Delta W/\Delta T$), compares said rate with the set rate ($\Delta W_o/\Delta T$), and tilts the electric furnace 1, as shown in FIG. 3, to bring the computed value ($\Delta W/\Delta T$) to the set value ($\Delta W_o/\Delta T$) as closely as possible. Since this type of control equipment is well known in the art it is shown only generally in the drawings and will not be described in any futher detail. When the computed value ($\Delta W/\Delta T$) falls below the set value ($\Delta W_o/\Delta T$) as the molten material inside the electric furnace 1 decreases, the electric furnace 1 is tilted down to bring both values closer together. Conversely, when the computed value rises above the set value after charging of the raw materials, the electric furnace 1 is tilted up. Introduction of the raw materials will cause a temporary drop in the temperature inside the electric furnace 1 and hence a temporary rise in the viscosity of the molten material. This will lower the value of $\Delta W/\Delta T$ and require tilting down of the electric furnace 1.

When to charge molten slag may be decided based on the weight determined of the electric furnace 1 and the weight of the charged molten slag can be determined accurately by weighing the electric furnace 1.

The electric furnace 1 is tilted by the hydraulic jack 11 provided on the pedestal 10. The piston 12 moves up and down by slow degrees in response to a signal from the control equipment 18 and tilts the electric furnace 1 to a desired position. The tilting mechanism is not limited to the hydraulic jack 11 as explained here and may be one driven by a motor and gear.

Figure 4:
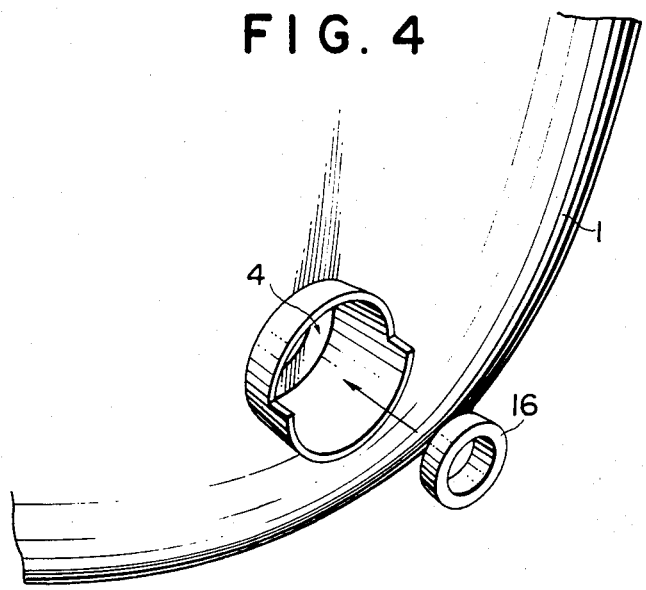
FIG. 4 is a view of the ring 16 and the nozzle 4.
Figure 5:
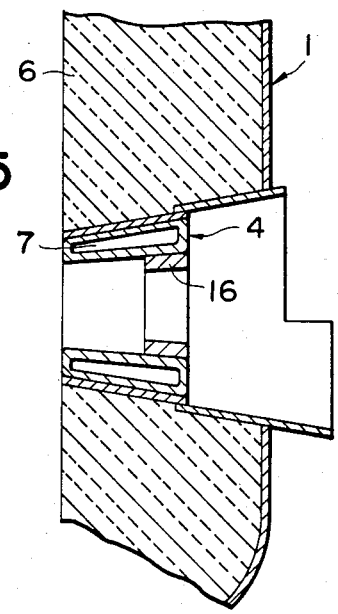
FIG. 5 is a sectional view of the nozzle and ring in assembly.

FIGS. 4 and 5 show the device designed for changing the rate of discharge from the electric furnace 1. The amount of the molten material emerging from the nozzle 4 varies with the viscosity and temperature of the molten material and may also be changed on purpose when the production volume or product grade needs to be changed. In this example, instead of replacing the nozzle 4 in whole, the ring 16 of a different inside diameter is inserted into the nozzle 4 to provide a different opening. The ring 16 is constructed to fit into the opening of the nozzle 4 from outside and is inserted and fixed by such means as welding. With several of such rings differing in inside diameter from one another on hand, it would be easy to change the discharge rate through the nozzle 4 by replacing the ring in use with one of a suitable inside diameter.

The present invention has been explained above with specific reference to the manufacture of rock wool from molten blast furnace slag. It is also applicable to the manufacture of rock wool from the crushed slag or natural rock such as basalt and andesite or to the manufacture of davitro ceram other than rock wool. Furthermore, the present invention is applicable to quantitative discharge of a molten material such as molten iron and molten copper and not only to electric furnaces but also to other types of furnaces.

As illustrated above, the method of the present invention for quantitative discharge of a molten material enables one to keep the rate of discharge of the molten material constant by a simple means of tilting the melting furnace to match the rate of change in weight of the molten material with respect to time to the set rate. This in turn makes it possible to process the molten material into a pruduct of higher quality in higher yeilds with no need for a larger and more complicated system compared with the conventional method.

What is claimed is:

1. In a method for intermittently charging a molten principal raw material and any supplementary material as needed to provide a specified raw material formulation into a melting furnace and continuously discharging a molten material therefrom, the method for quantitative discharge of the molten material comprising determining the weight of the tiltable melting furnace, said weight changing with the discharging of the molten material, computing the rate of change in weight of the molten material with respect to time from the determined weights of said furnace, and tilting said furnace to a position indicated by comparison of said computed rate of change in weight of the molten material with respect to time and the set rate of change in weight of the molten material with respect to time.

2. The method for quantitative discharge of the molten material as claimed in claim 1 wherein the weight of the melting furnace is determined by load cells provided between the melting furnace and the foundation.

3. The method for quantitative discharge of the molten material as claimed in claim 1 wherein the opening for discharge of the molten material from the melting furnace is a water-cooled nozzle.

4. The method for quantitative discharge of the molten material as claimed in claim 2 wherein the opening for discharge of the molten material from the melting furnace is a water-cooled nozzle.

5. The method for quantitative discharge of the molten material as claimed in claim 3 wherein the discharge of the molten material is controlled by inserting a ring into the nozzle.

6. The method for quantitative discharge of the molten material as claimed in claim 4 wherein the discharge of the molten material is controlled by inserting a ring into the nozzle.

7. The method for quantitative discharge of the molten material as claimed in claim 1 wherein the molten principal raw material charge into the melting furnace is molten slag available from the blast furnace.

8. The method for quantitative discharge of the molten material as claimed in claim 2 wherein the molten pricipal raw material charged into the melting furnace is molten slag available from the blast furnace.

9. The method for quantitative discharge of the molten material as claimed in claim 3 wherein the molten principal raw material charge into the melting furnace is molten slag available from the blast furnace.

10. The method for quantitative discharge of the molten material as claimed in claim 4 wherein the molten principal raw material charged into the melting furnace is molten slag available from the blast furnace.

11. The method for quantitative discharge of the molten material as claimed in claim 5 wherein the molten principal raw material charged into the melting furnace is molten slag available from the blast furnace.

12. The method for quantitative discharge of the molten material as claimed in claim 6 wherein the molten principal raw material charged into the melting furnace is molten slag available form the blast furnace.

13. The method for quantitative discharge of the molten material as claimed in claim 7 wherein molten slag and supplementary materials are charged intermittently into the tiltable melting furnace, the weight of said furnace is determined by the load cells provided between said furnace and the fundation, the rate of change in weight of the molten material inside said furnace with respect to time is computed from the measured weights of said furnace, said furnace is tilted to a position indicated by comparison of the computed rate with the set rate, the molten material is discharged quantitatively through the water-cooled nozzle, and a quantitative flow of the molten material is supplied to the fiberizing equipment to produce rock wool.

14. The method for quantitative discharge of the molten material as claimed in claim 8 wherein molten slag and supplementary materials are charged intermittently into the tiltable melting furnace, the weight of said furnace is determinde by the load cells provided between said furnace and the fundation, the rate of change in weight of the molten material inside said furnace with respect to time is computed from the measured weights of said furnace, said furnace is tilted to a position indicated by comparison of the computed rate with the set rate, the molten material is discharged quantitatively through the water-cooled nozzle, and a quantitative flow of the molten material is supplied to the fiberizing equipment to produce rock wool.

15. The method for quantitative discharge of the molten material as claimed in claim 9 wherein molten slag and supplementary materials are charged intermittently into the tiltable melting furnace, the weight of said furnace is determined by the load cells provided between said furnace and the fundation, the rate of change in weight of the molten material inside said furnace with respect to time is computed from the measured weights of said furnace, said furnace is tilted to a position indicated by comparison of the computed rate with the set rate, the molten material is discharged quantitatively through the water-cooled nozzled, and a quantitative flow of the molten material is supplied to the fiberizing equipment to produce rock wool.

16. The method for quantitative discharge of the molten material as claimed in claim 10 wherein molten slag and supplementary materials are charged intermittently into the tiltable melting furnace, the weight of said furnace is determined by the load cells provided between said furnace and the fundation, the rate of change in weight of the molten material inside said furnace with respect to time is computed from the measured weights of said furnace, said furnace is tilted to a position indicated by comparison of the computed rate with the set rate, the molten material is discharged quantitatively through the water-cooled nozzle, and a quantitative flow of the molten material is supplied to the fiberizing equipment to produce rock wool.

17. The method for quantitative discharge of the molten material as claimed in claim 11 wherein molten slag and supplementary materials are charged intermittently into the tiltable melting furnace, the weight of said furnace is determined by the load cells provided between said furnace and the fundation, the rate of change in weight of the molten material inside said furnace with respect to time is computed from the measured weights of said furnace, said furnace is tilted to a position indicated by comparison of the computed rate with the set rate, the molten material is discharged quantitatively through the water-cooled nozzle, and a quantitative flow of the molten material is supplied to the fiberizing equipment to produce rock wool.

18. The method for quantitative discharge of the molten material as claimed in claim 12 wherein molten slag and supplementary materials are charged intermittently into the tiltable melting furnace, the weight of said furnace is determined by the load cells provided between said furnace and the fundation, the rate of change in weight of the molten material inside said furnace with respect to time is computed from the measured weights of said furnace, said furnace is tilted to a position indicated by comparison of the computed rate with the set rate, the molten material is discharged quantitatively through the water-cooled nozzle, and a quantitative flow of the molten material is supplied to the fiberizing equipment to produce rock wool.

19. The method for quantitative discharge of the molten material as claimed in claim 1 further comprising the step of charging raw materials into said furnace, said weight also changing with said step of charging.

* * * * *

UNITED STATES PATENT AND TRADEMARK OFFICE
CERTIFICATE OF CORRECTION

PATENT NO. : 4,641,319

DATED : February 3, 1987

INVENTOR(S) : Takaatsu Nagai et al

It is certified that error appears in the above-identified patent and that said Letters Patent is hereby corrected as shown below:

Title page:

Assignee: Nippon Steel Chemical Co., Ltd.
Tokyo, Japan
and
Nippon Steel Corporation
Tokyo, Japan Signed and Sealed this Nineteenth Day of April, 1988

Attest:

DONALD J. QUIGG

Attesting Officer

Commissioner of Patents and Trademarks